(12) United States Patent
Schnitzler et al.

(10) Patent No.: US 10,146,040 B2
(45) Date of Patent: Dec. 4, 2018

(54) MICROSCOPE HAVING AN APERTURE LIMITER (71) Applicant: LEICA MICROSYSTEMS (SCHWEIZ) AG, Heerbrugg (CH)

(72) Inventors: Harald Schnitzler, Lüchingen (CH); Reto Zuest, Diepoldsau (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

(21) Appl. No.: 15/516,704

(22) PCT Filed: Oct. 1, 2015

(86) PCT No.: PCT/EP2015/072658
§ 371 (c)(1),
(2) Date: Apr. 4, 2017

(87) PCT Pub. No.: WO2016/055336
PCT Pub. Date: Apr. 14, 2016

(65) Prior Publication Data
US 2017/0299783 A1    Oct. 19, 2017

(30) Foreign Application Priority Data
Oct. 6, 2014    (DE) .................. 10 2014 114 468

(51) Int. Cl.
*G02B 21/18* (2006.01)
*G02B 21/00* (2006.01)
*G02B 5/00* (2006.01)
*G03B 9/07* (2006.01)
*G02B 21/02* (2006.01)
(Continued)

(52) U.S. Cl.
CPC ............. *G02B 21/18* (2013.01); *G02B 5/005* (2013.01); *G02B 21/004* (2013.01); *G02B 21/025* (2013.01); *G02B 21/06* (2013.01); *G02B 21/22* (2013.01); *G02B 26/023* (2013.01); *G03B 9/07* (2013.01)

(58) Field of Classification Search
CPC .. G02B 21/004; G02B 21/18; G02B 21/0032; G02B 21/02; G02B 21/025; G02B 21/06; G02B 21/22; G02B 5/005; G03B 9/07
USPC .................. 359/372, 373, 368, 656–661
See application file for complete search history.

(56) References Cited

U.S. PATENT DOCUMENTS

| 6,396,628 B1 | 5/2002 | Osa et al. |
| 2002/0118453 A1 | 8/2002 | Geier et al. |
(Continued)

FOREIGN PATENT DOCUMENTS

| DE | 102004006066 A1 | 8/2005 |
| DE | 102008037074 A1 | 2/2010 |
(Continued)

*Primary Examiner* — Jordan Schwartz
(74) *Attorney, Agent, or Firm* — Hodgson Russ LLP (57) ABSTRACT

A microscope (10) is described, having an aperture limiter (12), arranged in the beam path (22), for generating at least one optical channel (16; 18; 20). The aperture limiter (12) is embodied to set the aperture of the at least one optical channel (16; 18; 20). The aperture limiter (12) is furthermore embodied in such a way that in a first operating mode a first optical channel, and in a second operating mode at least one second optical channel, is selectively generable. The aperture limiter is also arranged in the pupil plane of the beam path.

10 Claims, 6 Drawing Sheets

(51) Int. Cl.
*G02B 26/02* (2006.01)
*G02B 21/06* (2006.01)
*G02B 21/22* (2006.01)

(56) References Cited

U.S. PATENT DOCUMENTS

| | | |
|---|---|---|
| 2005/0168809 A1 | 8/2005 | Moller et al. |
| 2006/0291031 A1* | 12/2006 | Boehm .................. G02B 5/005 359/279 |
| 2012/0008195 A1* | 1/2012 | Hoegele ............... G02B 21/025 359/380 |
| 2013/0010087 A1* | 1/2013 | Nieten ................... H04N 5/238 348/50 |
| 2013/0258090 A1 | 10/2013 | Steinmeyer et al. |

FOREIGN PATENT DOCUMENTS

| | | |
|---|---|---|
| DE | 102009041405 A1 | 3/2011 |
| DE | 102010013528 A1 | 10/2011 |
| DE | 102011100997 A1 | 11/2012 |
| DE | 202013011877 U1 | 9/2014 |
| JP | 2006064976 A | 3/2006 |
| JP | 2013167746 A | 8/2013 |
| WO | 2005045503 A1 | 5/2005 |

* cited by examiner

MICROSCOPE HAVING AN APERTURE LIMITER

CROSS-REFERENCE TO RELATED APPLICATIONS

The present application is the U.S. national phase of International Application No. PCT/EP2015/072658 filed Oct. 1, 2015, which claims priority of German Application No. 10 2014 114 468.6 filed Oct. 6, 2014, the entire disclosure of which is incorporated herein by reference.

FIELD OF THE INVENTION

The invention relates to a microscope having an aperture limiter, arranged in the beam path, for generating at least one optical channel.

BACKGROUND OF THE INVENTION

Fixed pupil limiting systems in the form of an aperture stop, adjustable pupil limiting systems in the form of an iris diaphragm, iris openings mechanically constrainedly controlled with zoom position, and motor-driven iris diaphragms, are known from the existing art. These are always opaque mechanical stops that are shaped for the desired limitation of the pupil diameter and allow light beams to pass freely in the region of the pupil and sharply delimit that region.

Also known from the existing art are electronically controlled shutters in LC displays, for example in televisions and computer monitors. The pixel arrays provided in this context allow the brightness value of each individual pixel to be set. All applications of these components serve, however, to emit an image, the so-called shutter matrix being located in the image plane.

Known mechanical pupil limiting systems comprise a fixed aperture or several blades which make possible a predefined, usually approximately circular shape for the pupil in the context of pupil adjustment. The known mechanical pupil limiting systems have the disadvantage that an almost arbitrary pupil shape or a lateral shift of the pupil is possible with them only in very limited fashion or only with great mechanical complexity. Flexible, automated control of pupil limitation, on the other hand, is attracting an increasing level of interest in microscopy.

The known mechanical pupil limiting systems furthermore have the disadvantage that the time required for mechanical adjustment of the aperture is not negligible. With the known mechanical components in particular, rapid adjustment of the aperture is not achievable, or achievable only with great complexity. The structural requirements associated with this lead to high levels of mechanical stress, wear, and noise emission.

SUMMARY OF THE INVENTION

Proceeding from the known existing art, the object of the invention is to describe a microscope that enables flexible and rapid generation of at least one optical channel, and at the same time high image quality.

This object is achieved by a microscope having the features described herein. Advantageous refinements are also described herein.

The microscope described herein generally comprises an aperture limiter arranged in the beam path for generating at least one optical channel, the aperture limiter being embodied to set the aperture of the at least one optical channel, wherein the aperture limiter is embodied in such a way that in a first operating mode a first optical channel, and in a second operating mode at least one second optical channel, is selectively generable, and the aperture limiter is arranged in the pupil plane of the beam path. A microscope having these features allows flexible and rapid generation of the at least one optical channel and at the same time high image quality, in particular because an aperture limiter arranged in the pupil plane of the beam path is provided. The aperture limiter is furthermore embodied to set the aperture of the at least one optical channel. This enables flexible and rapid generation of the at least one optical channel, and at the same time high image quality. For example, the microscope encompasses a beam splitter as well as a tube having at least one eyepiece. The object to be investigated can thus be observed visually via the at least one optical channel. Alternatively or additionally, an acquired image of the object to be investigated can be displayed via a 3D screen with the aid of 3D eyeglasses.

It is advantageous in this context if the aperture limiter is embodied in such a way that in a first operating mode a first optical channel, and in a second operating mode at least one second optical channel, is selectively generable. Preferably the aperture limiter is embodied in such a way that in the first operating mode the first optical channel is centered relative to the optical axis of the beam path; and that in the second operating mode the at least one second optical channel is laterally offset relative to the optical axis of the beam path. The macroscope mode having a central optical channel, and the stereomicroscope mode having a decentral optical channel, can thus be selectively furnished.

It is advantageous if the aperture limiter encompasses a plurality of electronically controllable segments, the transmissivity or reflectivity of each segment of the electronically controllable segments being individually controllable. Generation of the at least one optical channel can thus be carried out relatively flexibly. Generation of the at least one optical channel can furthermore be carried out in transmission or in reflection.

It is also advantageous if the aperture limiter is embodied in such a way that two or more optical channels laterally offset with respect to one another are also selectably generated. Different operating modes can thus be implemented with the aid of a single microscope and with no modification of the lens system.

It is furthermore advantageous if the aperture limiter is embodied in such a way that in the second operating mode, the at least one second optical channel and a third optical channel are generated sequentially; and that the at least one second optical channel and the third optical channel are each laterally offset relative to the optical axis of the beam path. The stereomicroscope mode can thus be furnished with two sequentially generated, decentered optical channels.

Preferably the aperture limiting systems are controlled in such a way that at one point in time exactly one beam path is always being generated, i.e. either a centered aperture limitation or a first decentral aperture limitation or a further decentral aperture limitation having a different offset. The stereomicroscope mode can thus be achieved sequentially by synchronized opening and closing of the respective optical channel with the respectively pertinent different settings of the aperture limiter.

Optionally the microscope is characterized by a first shutter (or first closure element) and a second shutter (or second closure element), the first shutter, the second shutter, and the aperture limiter being configured in such a way that in the second operating mode the first shutter is opened and the second shutter is closed when the at least one second optical channel is generated; and that the second shutter is opened and the first shutter is closed when the third optical channel is generated.

Preferably the aperture limiter is embodied in such a way that in the second operating mode the at least one second optical channel and the third optical channel are sequentially generated at a frequency that is higher than or equal to the flicker fusion frequency. A continuous image of an object to be investigated can thus be visually acquired in the stereomicroscope mode.

It is also advantageous if the microscope is characterized by a controller for controlling the aperture limiter, and by a zoom system, the aperture limiter being provided in the zoom system, and the controller applying control to the aperture limiter in such a way that the aperture of at least one of the first and the second optical channel is set as a function of a zoom setting of the zoom system. The aperture of the at least one optical channel can thereby be set automatically.

Preferably the controller applies control to the aperture limiter in such a way that the aperture of at least one of the first and the second optical channel is set as a function of at least one user preference of a user of the microscope. The automatic setting of the aperture of the at least one optical channel can thus be influenced by a desired user preference.

Preferably the at least one user preference encompasses a desired maximum resolution, a desired constant image brightness, or a desired tradeoff between depth of focus and resolution. The automatic setting of the aperture of the at least one optical channel can thus be flexibly influenced.

It is also advantageous if the aperture limiter is embodied in such a way that the aperture of at least one of the first and the second optical channel is set in such a way that the transmissivity of the electrically controllable segments is continuously decreased in a lateral direction from the optical axis of the beam path, i.e. from the center of the optical beam path. A so-called pupil apodization can thereby be implemented, with the result that image quality can be even further enhanced.

Preferably the aperture limiter is a liquid crystal matrix having a two-dimensional grid of LCD segments.

Alternatively, instead of the aperture limiter having the plurality of electronically controllable segments in the pupil plane of the beam path, an aperture limiter for limiting the at least one optical channel can be provided with the aid of an associated mechanical element.

BRIEF DESCRIPTION OF THE DRAWING VIEWS

Further features and advantages of the invention are evident from the description below, which explains the invention with reference to exemplifying embodiments in conjunction with the attached Figures, in which.

DETAILED DESCRIPTION OF THE INVENTION

Figure 1:
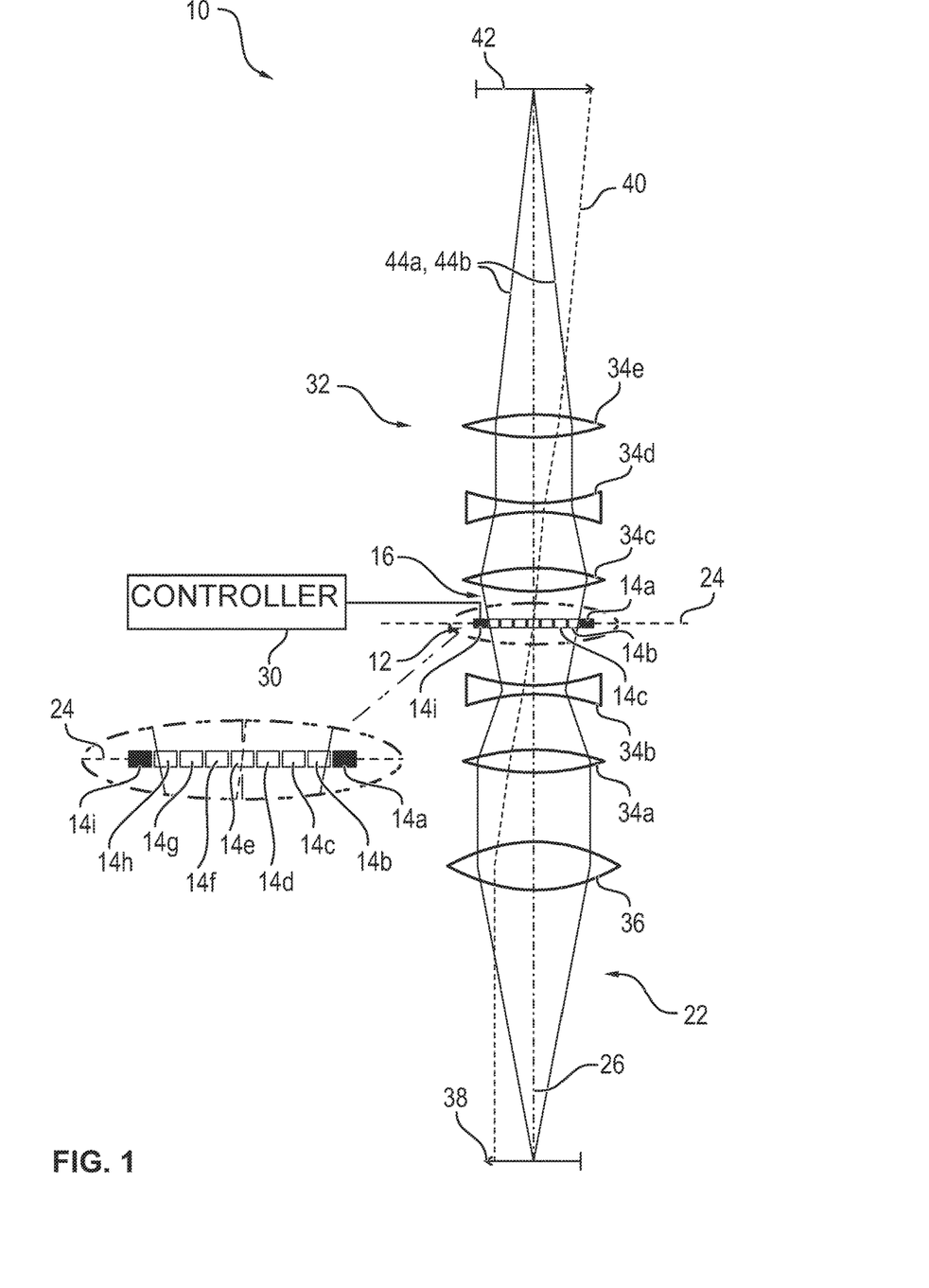
FIG. 1 schematically depicts a microscope according to the present invention having an aperture limiter, arranged in the beam path, for generating a central optical channel.

FIG. 1 schematically depicts a microscope 10 according to the present invention having an aperture limiter 12, arranged in beam path 22, for generating a central optical channel 16. Microscope 10 serves to detect image 42 of an object 38 to be investigated. As shown in FIG. 1, microscope 10 encompasses an objective 36 and a zoom system 32. Objective 36 and zoom system 32 are arranged in beam path 22 between object 38 to be investigated and detected image 42. Objective 36 faces toward object 38 to be investigated. Zoom system 32 is furthermore arranged after objective 36 in the light flow direction. The "light flow direction" is defined as the direction of the light rays from object 38 to be investigated to detected image 42. As shown in FIG. 1, zoom system 32 encompasses several lens groups 34a to 34e. In particular, lens groups 34a to 34e of zoom system 32 are arranged one after another in the light flow direction. Zoom system 32 serves to set a desired zoom setting for microscope 10.

In all the exemplifying embodiments, optical axis 26 of beam path 22 corresponds to the axis of symmetry of objective 36 and of lens groups 34a to 34e of zoom system 32. In particular, optical axis 26 of beam path 22 corresponds to the optical axis of the lens system constituted by lens groups 34a to 34e.

Aperture limiter 12 of microscope 10 shown in FIG. 1 is arranged in pupil plane 24 of beam path 22. Pupil plane 24 is located between lens groups 34b and 34c of zoom system 32, and is perpendicular to optical axis 26. As shown in FIG. 1, aperture limiter 12 encompasses several electronically controllable segments 14a to 14i, the transmissivity of each segment of electronically controllable segments 14a to 14i being individually controllable. Aperture limiter 12 according to FIG. 1 serves to set the aperture of central optical channel 16, central optical channel 16 being obtained by a beam limitation generated with the aid of aperture limiter 12.

Central optical channel 16 is defined as the ray bundle that is limited by a beam limitation generated with the aid of aperture limiter 12 located in pupil plane 24. The ray bundle encompasses light rays that extend between object 38 to be investigated and detected image 42. The ray bundle furthermore encompasses marginal rays 44a, 44b that are defined by the beam limitation that is generated; i.e. central optical channel 16 encompasses marginal rays 44a, 44b of the ray bundle limited with the aid of aperture limiter.

With microscope 10 shown in FIG. 1, the aperture of central optical channel 16 is set in such a way that the transmissivity of close-to-axis segments 14b to 14h is 1, while the transmissivity of off-axis segments 14a, 14i is 0. Close-to-axis segments 14b to 14h here are those segments of electronically controllable segments 14a to 14i which are arranged in a central region around optical axis 26, while off-axis segments 14a, 14i are those segments of electronically controlled segments 14a to 14i which are arranged outside that central region. Central optical channel 16 is thus generated only in the central region around optical axis 26 where the transmittance of aperture limiter 12 is maximal, i.e. 1.

Instead of the above setting of the transmissivity, the outermost segments 14a, 14i, which should always have a transmissivity of 0, can also be omitted. In this case the maximum opening of component 12 is delimited by a suitable mount, so that only active segments need to be manufactured.

According to FIG. 1 a macroscope mode can be implemented for microscope 10, a beam path with one large central aperture opening being provided. The principal ray of the image edge is indicated in FIG. 1 by the dashed line 40.

Figure 2:
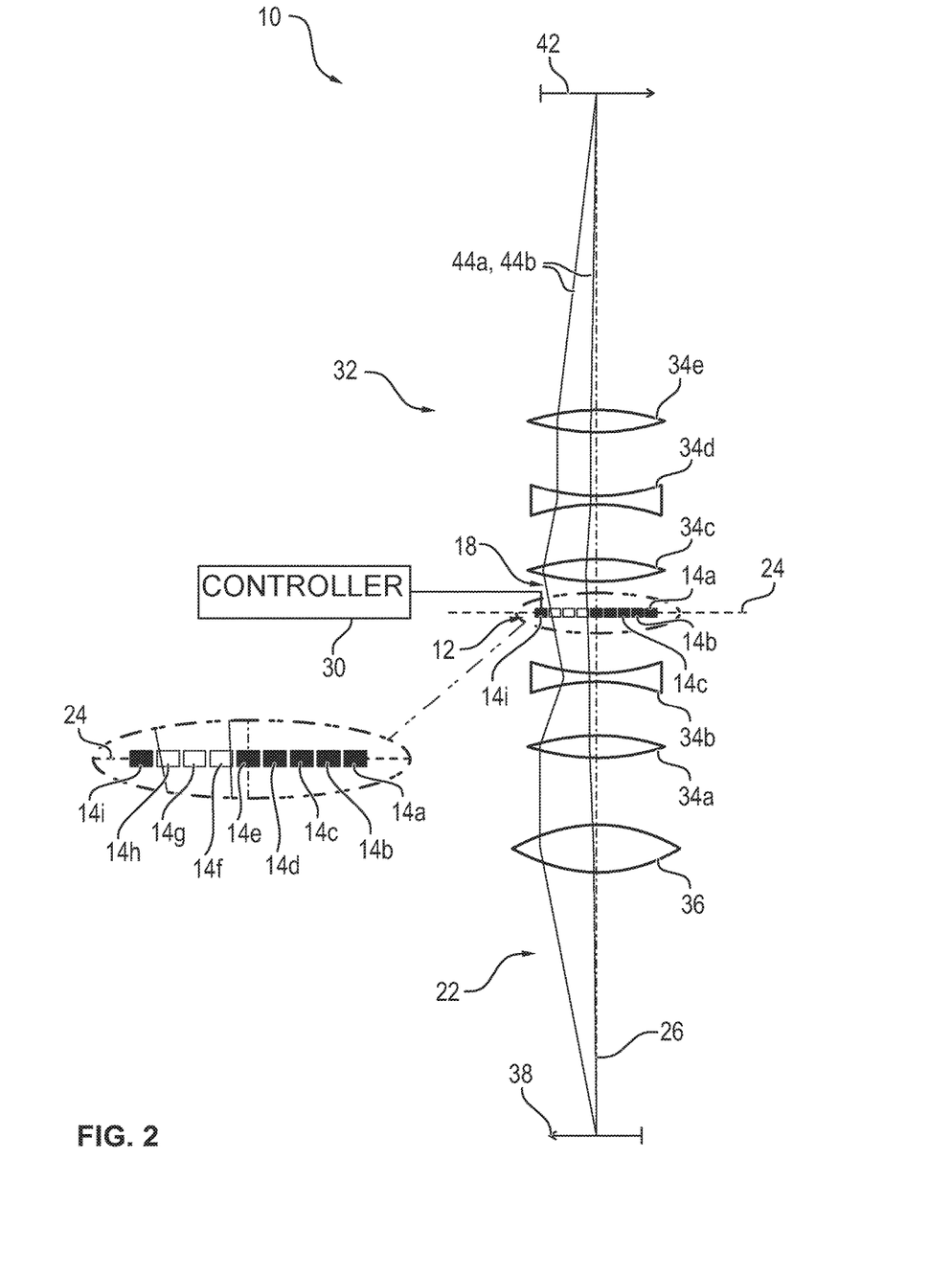
FIG. 2 schematically depicts the microscope according to the present invention of FIG. 1 having an aperture limiter, arranged in the beam path, for generating a decentral optical channel.

FIG. 2 schematically depicts microscope 10 according to the present invention in accordance with FIG. 1, having an aperture limiter 12 arranged in beam path 22 for generating a decentral optical channel 18. As shown in FIG. 2, decentral optical channel 18 is laterally offset relative to optical axis 26 of beam path 22, the "lateral" direction being defined as a direction that is perpendicular to optical axis 26.

Aperture limiter 12 according to FIG. 2 serves to set the aperture of decentral optical channel 18, decentral optical channel 18 being obtained by a beam limitation generated with the aid of aperture limiter 12. Decentral optical channel 18 is defined as the ray bundle that is limited by a beam limitation generated with the aid of aperture limiter 12 located in pupil plane 24. The ray bundle encompasses light rays that extend between object 38 to be investigated and detected image 42. The ray bundle furthermore encompasses marginal rays 44a, 44b that are defined by the beam limitation that is defined; in other words, decentral optical channel 18 encompasses marginal rays 44a, 44b of the ray bundle limited with the aid of aperture limiter 12.

The aperture of decentral optical channel 18 is set by the fact that the transmissivity of segments 14f to 14h arranged in a decentral region is 1, while the transmissivity of the remaining segments 14a to 14e and 14i is 0. Segments 14f to 14h arranged in the decentral region are provided between a central segment 14e located on optical axis 26, and a marginal segment 14i of electronically controllable segments 14a to 14i. Decentral optical channel 18 is thus generated only in that decentral region in which the transmittance set with the aid of aperture limiter 12 is maximal, i.e. 1.

Optionally, the outermost segments 14a, 14i, whose transmissivity should always be 0, can also be omitted. In this case the maximum opening of component 12 is again limited by a suitable mount.

According to FIG. 2, a stereomicroscope mode can be implemented for microscope 10, a beam path with a decentral partial pupil opening being provided. In FIG. 2 the stereomicroscope mode is depicted by way of example for a left channel of microscope 10.

Figure 3:
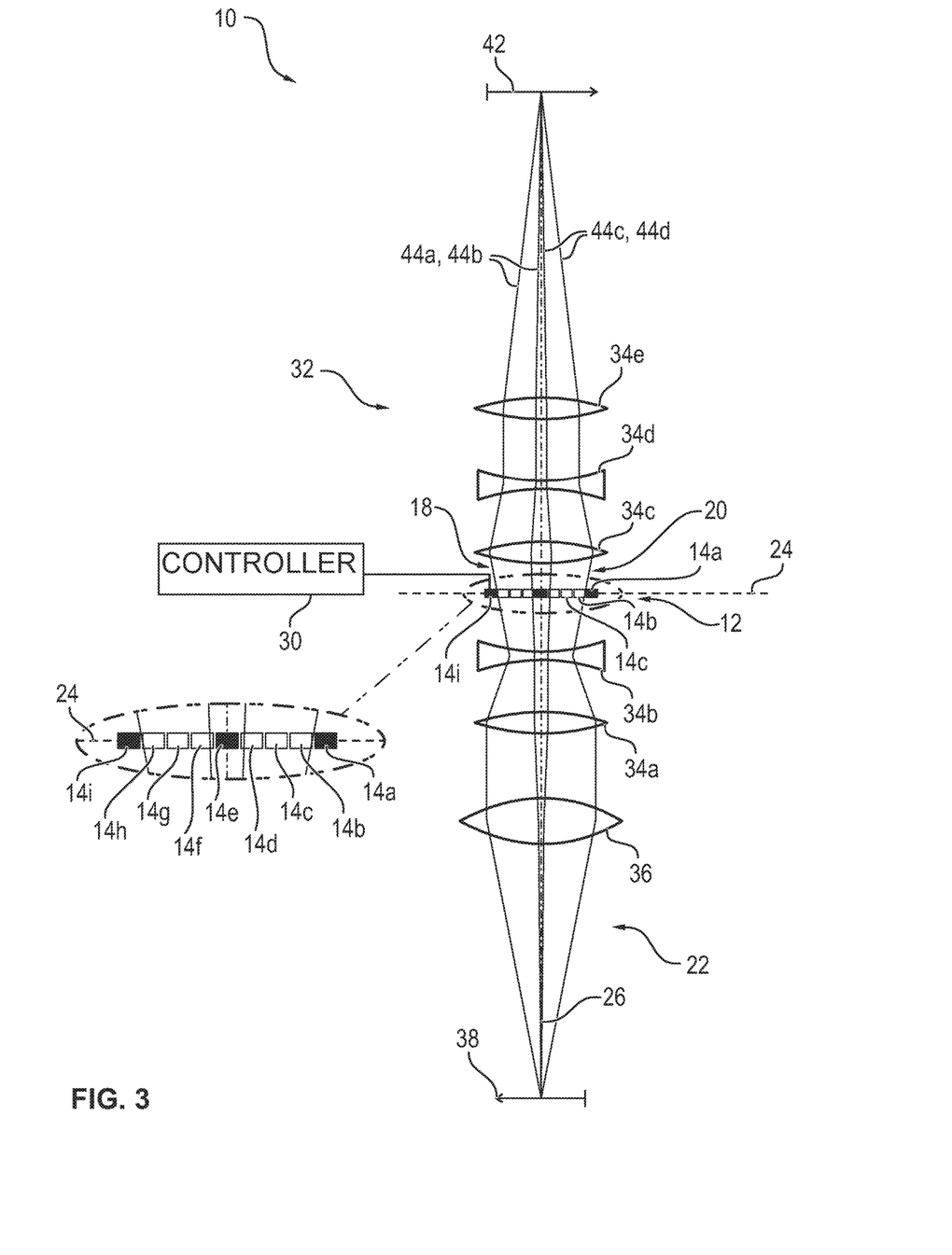
FIG. 3 schematically depicts the microscope according to the present invention of FIG. 1 having an aperture limiter, arranged in the beam path, for generating two decentral optical channels in transmission.

FIG. 3 schematically depicts microscope 10 according to the present invention in accordance with FIG. 1, having an aperture limiter 12 arranged in the beam path for generating two decentral optical channels 18, 20 in transmission. As shown in FIG. 3, the two decentral optical channels 18, 20 are each laterally offset relative to optical axis 26 of beam path 22. The two decentral optical channels 18, 20 are arranged symmetrically relative to optical axis 26.

Aperture limiter 12 according to FIG. 3 serves to set the aperture of the two decentral optical channels 18, 20, the two decentral optical channels 18, 20 being obtained by a beam limitation generated with the aid of aperture limiter 12.

The two decentral optical channels 18, 20 are each defined as the ray bundle that is limited by a beam limitation generated with the aid of aperture limiter 12 located in pupil plane 24. The ray bundle encompasses light rays that extend between object 38 to be investigated and detected image 42. The ray bundle furthermore encompasses respective marginal rays 44a, 44b and 44c, 44d that are defined by the beam limitation that is generated. In other words, the two decentral optical channels 18, 20 encompass respective marginal rays 44a, 44b and 44c, 44d of the ray bundle limited with the aid of aperture limiter 12.

The aperture of the two decentral optical channels 18, 20 is set by the fact that the transmissivity of the respective decentrally arranged segments 14b to 14d and 14f to 14h of electronically controllable segments 14a to 14i is 1, while the transmissivity of the remaining segments 14a, 14e, 14i is 0. The respective segments 14b to 14d and 14f to 14h arranged in the decentral region are provided between central segment 14e located on optical axis 26 and a respective marginal segment 14a, 14i of electronically controllable segments 14a to 14i. The two decentral optical channels 18, 20 are thus generated only in the decentral region in which the transmittance set with the aid of aperture limiter 12 is maximal, i.e. 1.

Optionally, the outermost segments 14a, 14i, whose transmissivity should always be 0, can also be omitted. In this case the maximum opening of component 12 is once again limited by a suitable mount.

According to FIG. 3, a stereomicroscope mode can be implemented for microscope 10, a beam path with two decentral partial pupil openings being provided. In FIG. 3 the stereomicroscope mode is depicted by way of example for a left channel and a right channel of microscope 10.

In the stereomicroscope mode according to FIG. 3, the two decentral optical channels 18, 20 are generated sequentially.

Sequential generation of the two decentral optical channels 18, 20 is carried out with the aid of aperture limiter 12 in such a way that the frequency for switching over between the left channel and the right channel, and between the right channel and the left channel, is higher than or equal to the flicker fusion frequency. This switchover frequency is preferably higher than 50 Hz.

Figure 4:
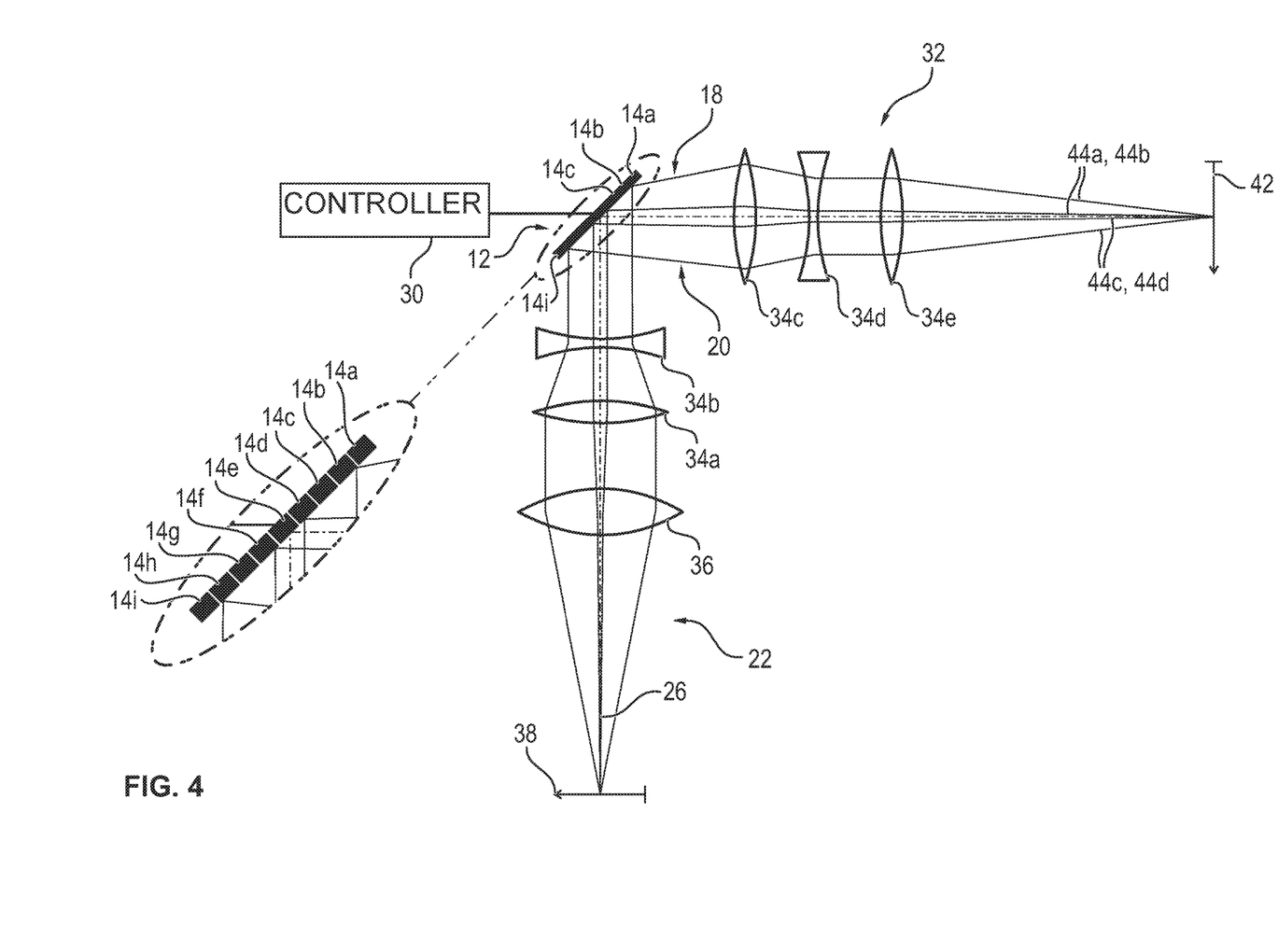
FIG. 4 schematically depicts the microscope according to the present invention of FIG. 1 having an aperture limiter, arranged in the beam path, for generating two decentral optical channels in reflection.

FIG. 4 schematically depicts microscope 10 according to the present invention in accordance with FIG. 1, having an aperture limiter 12 arranged in beam path 22 for generating two decentral optical channels 18, 20 in reflection. As shown in FIG. 4, aperture limiter 12 is oriented at an angle of 45° with respect to optical axis 26. Unlike the beam path shown in FIGS. 1 to 3, beam path 22 in FIG. 4 is angled. Beam path 22 shown in FIG. 4 encompasses a first portion before aperture limiter 12 in the light flow direction, and a second portion after aperture delimiter 12 in the light flow direction. Zoom system 32 furthermore encompasses lens groups 34a, 34b that are arranged in the first portion of beam path 22, and lens groups 34c to 34e that are arranged in the second portion of beam path 22. Lens groups 34a to 34e of zoom system 32 are once again arranged one after another in the light flow direction.

As shown in FIG. 4, aperture limiter 12 is arranged at an angle of 45° relative to optical axis 26 and is provided between lens groups 34b, 34c of zoom system 32. In contrast to FIGS. 1 to 3, with aperture limiter 12 shown in FIG. 4 the reflectivity of each segment of electronically controllable segments 14a to 14i is individually controllable, the aperture of the two decentral optical channels 18, 20 being set by the fact that the reflectivity at least of those respective segments 14b to 14d and 14f to 14h of electronically controllable segments 14a to 14i which are associated with the respective decentral optical channels, is 1. The decentral optical channels generated in reflection as shown in FIG. 4 correspond substantially to the decentral optical channels generated in transmission according to FIG. 3.

According to FIG. 4, the stereomicroscope mode for microscope 10 can be implemented with two sequentially generated decentral optical channels 18, 20 in reflection.

Figure 5A:
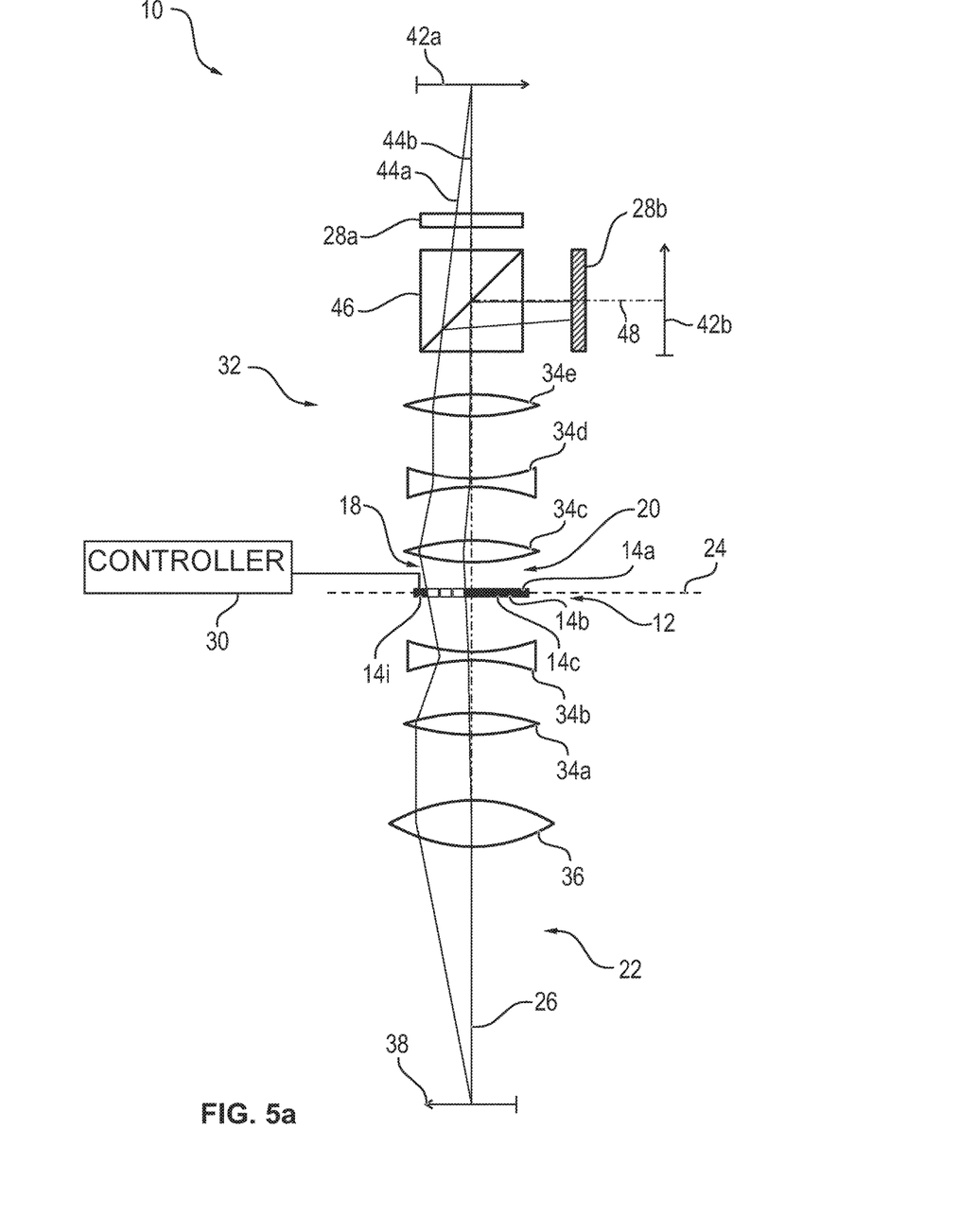
FIGS. 5a, 5b are schematic depictions of the microscope according to the present invention in accordance with FIG. 1, having a beam splitter arranged in the beam path.
Figure 5B:
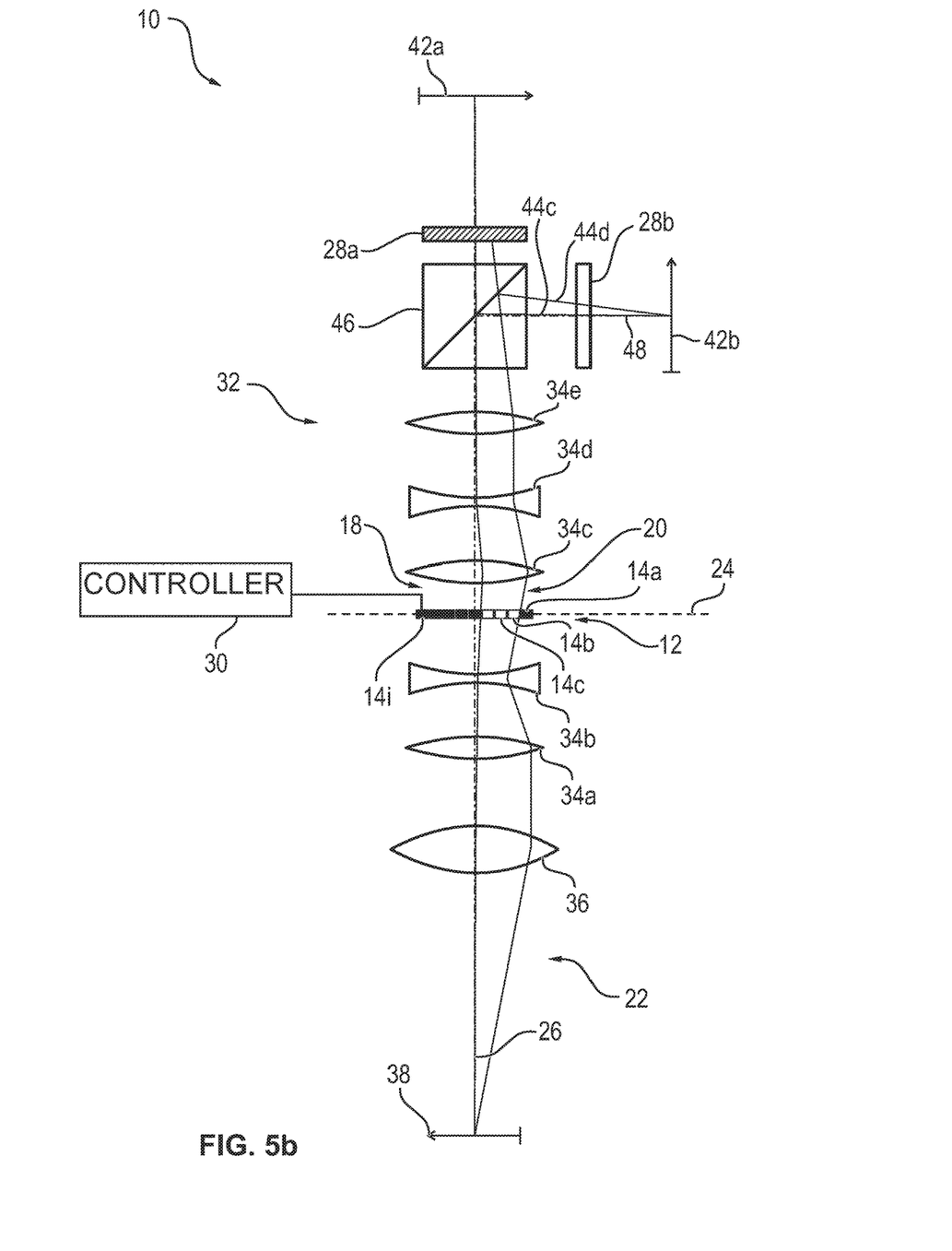

FIGS. 5a and 5b schematically depict microscope 10 according to the present invention in accordance with FIG. 1, having a beam splitter 46 arranged in beam path 22. Microscope 10 shown in FIGS. 5a and 5b furthermore encompasses a first closure element 28a and a second closure element 28b. Aperture limiter 12 according to FIGS. 5a and 5b, arranged in beam path 22, serves for sequential setting of the aperture of the two decentral optical channels 18, 20. Beam splitter 46 is arranged after zoom system 32 in the light flow direction. Beam splitter 46 serves to generate an outcoupled beam path having axis 48. First closure element 28a and second closure element 28b are arranged after beam splitter 46 in the light flow direction. First closure element 28a serves to open and close decentral optical channel 18, i.e. the left channel, while second closure element 28b serves to open and close decentral optical channel 20, i.e. the right channel. Microscope 10 shown in FIGS. 5a and 5b encompasses a first eyepiece for the left channel and a second eyepiece for the right channel. The first eyepiece serves to capture a first image 42a via decentral optical channel 18, while the second eyepiece serves to capture a second image 42b via decentral optical channel 20.

As shown in FIG. 5a, first closure element 28a, second closure element 28b, and aperture limiter 12 are synchronized in such a way that first closure element 28a is opened and second closure element 28b is closed when left channel 18 is generated. FIG. 5b furthermore shows that first closure element 28a, second closure element 28b, and aperture limiter 12 are synchronized in such a way that second closure element 28b is opened, and first closure element 28a is closed, when right channel 20 is generated.

In the configuration according to FIG. 5a, in the opened state first closure element 28a, left channel 18 is therefore furnished here for the first eyepiece. Left channel 18 is defined here as the ray bundle of those light rays which extend between object 38 to be investigated and image 42a captured with the first eyepiece, the ray bundle encompassing marginal rays 44a, 44b. In addition, in the configuration in FIG. 5a the ray bundle of the light rays that are coupled out from beam splitter 46 is blocked by second closure element 28b when the latter is in the closed state. In this case only image 42a is therefore captured with the first eyepiece.

Furthermore, in the configuration according to FIG. 5b, in the opened state of second closure element 28b, right channel 20 is furnished for the second eyepiece. Right channel 20 is defined here as the ray bundle of the light rays that extend between object 38 to be investigated and image 42b captured with the second eyepiece, the ray bundle encompassing marginal rays 44c, 44d. In addition, in the configuration in FIG. 5b the ray bundle of the light rays that pass through beam splitter 46 is blocked by first closure element 28a when the latter is in the closed state. In this case only image 42b is therefore captured with the second eyepiece.

According to FIGS. 5a and 5b a beam path is implemented for generating left image 42a, i.e. the one captured with the first eyepiece, and right image 42b, i.e. the one captured with the second eyepiece, for a stereoscopic view through two eyepieces. FIG. 5a schematically depicts image capture for a left perspective with the left, i.e. first, eyepiece. FIG. 5b furthermore schematically depicts image capture for a right perspective with the right, i.e. second, eyepiece. The stereo mode can be furnished by way of the configuration according to FIGS. 5a and 5b. This stereo mode enables stereomicroscopic observation through two eyepieces, to which the stereo images can be delivered above the flicker fusion frequency using synchronized closure elements.

Microscope 10 is characterized by a diffraction-limited resolution, said microscope resolving up to the optical diffraction limit in each configuration. In particular, at a wavelength of 550 nm the following relationship applies:

$$R = 3000 \cdot nA,$$

where R is the resolution in line pairs per mm and nA is the numerical aperture.

Referring to FIGS. 1 to 4 and to FIGS. 5a and 5b, microscope 10 encompasses a controller 30 for controlling aperture limiter 12 provided in zoom system 32. Control is applied to aperture limiter 12 by controller 30 in such a way that the aperture of the at least one optical channel 16; 18; 20 is set as a function of a zoom setting of zoom system 32. In addition, control can be applied by controller 30 to aperture limiter 12 in such a way that the aperture of the at least one optical channel 16; 18; 20 is set as a function of a desired user preference, the user preference encompassing a desired maximum resolution, a desired constant image brightness, or a desired tradeoff between depth of focus and resolution. In particular, the three scenarios below can be implemented in the context of the control of aperture limiter 12 provided in zoom system 32.

In a first scenario the aperture of the optical channel is set to be as large as possible; in other words, using aperture limiter 12, the beam cross section set is the largest one possible with the predefined lens design. In this first scenario the user obtains the highest possible resolution for the microscope, since the numerical aperture (nA) is set to be as large as possible. In other words, the highest resolution is achieved by setting the maximum aperture. In a second and a third scenario the respective aperture is deliberately made smaller in order to achieve application-specific advantages. In order to maintain the same image brightness at each zoom setting, for example for constant exposure times, in the second scenario the aperture of the optical channel is set so that the condition $$\text{magnification} \cdot nA = \text{constant}$$

is satisfied. Because the respective maximum possible aperture in the first scenario does not necessarily conform to this condition over the zoom profile, it makes sense to allow this to be selected as an option thanks to suitable control of aperture limiter 12. In addition, in a third scenario the aperture of the optical channel can be set in such a way that an increased depth of focus is obtained at the cost of resolution. Here the aperture is set, for example, to 50% of the values from the first scenario or second scenario. The three scenarios just described can be controlled by means of the desired user preference.

Thanks to the introduction of aperture limiter 12 into optical zoom system 32, the aperture can be variably controlled, flexibly and as a function of the zoom setting.

Aperture limiter 12 shown in FIGS. 1 to 4 and FIGS. 5a to 5b is, in particular, a liquid crystal matrix having a two-dimensional grid of liquid crystal display (LCD) segments.

In particular, the macroscope mode with the large central aperture opening, and the stereomicroscope mode with the two decentral partial pupil openings, can be selectably furnished as shown in FIGS. 1 and 3. Selectable furnishing of these two modes is brought about here in a single microscope 10.

Microscope 10 encompasses a stereo tube for the stereomicroscope mode, i.e. a tube having two eyepieces for visual viewing with each eye. Alternatively or additionally, the acquired image of the object to be investigated can also be displayed via a 3D screen with the aid of 3D eyeglasses.

Aperture limiter 12 is embodied in such a way that the size, i.e. the lateral extent, of the cross-sectional area; the location, i.e. the position laterally offset relative to optical axis 26; and the shape, for example a circular shape, are variably settable. Aperture limiter 12 furthermore serves to set the number of optical channels.

The aperture of the at least one optical channel 16; 18; 20 can furthermore be set with the aid of aperture limiter 12 in such a way that the transmissivity of electrically controllable segments 14a to 14i is continuously decreased in a lateral direction from optical axis 26 of beam path 22. Instead of a rectangular function for the transmittance, it is thus possible to achieve a continuous profile transversely to optical axis 26, for example a sinusoidal curve, for the transmittance.

The present invention creates a microscope 10 having in optical beam path 22 a pupil-limiting element, i.e. aperture limiter 12, which can be electronically controlled. The control system allows the pupil diameter; the location of the pupil, in particular laterally, i.e. transversely to the optical axis; and the pupil distribution or pupil shape, to be variably set electronically. The "pupil" corresponds here to the aperture or opening in beam path 22.

Aperture limiter 12 can encompass, for example a liquid crystal matrix, and can be configured similarly to the pixel matrix of an LC display. Aperture limiter 12 is introduced, in particular in transmission, at the location of the pupil of optical beam path 22. Transmittance can be locally switched on and off by controlling the matrix elements, i.e. electronically controllable segments 14a to 14i, of aperture limiter 12. The size of the pupil, the lateral location of the pupil opening, or the pupil shape can thereby be flexibly controlled, in particular electronically.

Alternatively, aperture limiter 12 can also encompass a grid of micromirrors, i.e. a micromirror array or a "liquid crystal on silicon" (LCoS) element as used, for example, in beamers in order to switch pixels on and off. In this case aperture limiter 12 is introduced in reflection into optical beam path 22, which therefore necessitates a somewhat longer optical path length.

According to the present invention aperture limiter 12 is introduced into pupil plane 24, i.e. not into the image plane. Aperture limiter 12 should therefore satisfy particular requirements in terms of providing homogeneity for the transmitted or reflected wavefront that extends, in a context of utilization of aperture limiter 12 according to the present invention, over many matrix elements thereof.

According to the present invention, aperture limiter 12 is introduced in the form of a shutter matrix into pupil plane 24 of beam path 22, and is used in particular to control the aperture. Different technical demands on aperture limiter 12 therefore also result for different applications. Because the ray bundle of each image points extends, by definition, in the pupil over the entire cross section of the pupil, assurance should be provided that the extended wavefronts of each image point pass through aperture limiter 12 over the same cross section without significant wavefront deformation, i.e. considerably better than $\lambda/4$ where $\lambda$ is the wavelength. This is not ensured with the use of known LCDs, and also not necessary, since there the wavefront of each image point arises in exactly one element of the matrix and is not extended.

The present invention makes it possible to furnish, in a microscope, an electronically controlled shutter matrix that can limit the pupil to different shapes or different locations without macroscopic mechanical movements, in particular in a very short time, i.e. with a switching time <10 ms.

In contrast to known systems in which, in particular, the time required for mechanical adjustment of the aperture is not negligible and does not permit fast adjustment, for example between two frames of a video camera, e.g. at 30 Hz, the present invention in fact permits a switchover above the flicker frequency of the human eye. It has been recognized that this is not achievable with the known mechanical components, or entails an unrealistically large outlay for moving the structure, which is associated in particular with high levels of mechanical stress, wear, and noise emission.

It has been recognized in particular that replacing mechanical pupil limitation with electronically controlled pupil limitation with the aid of aperture limiter 12 offers the advantage of a compact, wear-free, flexible, and quickly adjustable element. According to the present invention, different user preferences for zoom behavior, in particular maximum resolution, constant brightness, or maximum depth of focus, can be implemented in ideal fashion using aperture limiter 12 for pupil limitation, i.e. with no mechanical outlay, and simply via firmware programming. Lateral movement of the limited pupil makes it possible to capture images from different perspective angles. Because the present invention makes possible electronic adjustability of the optical channels, the angle for perspective imaging can be selected extremely flexibly. That makes possible sequential, digital capture of an object from different directions, and 3D reconstruction or depiction by means of a 3D display. A further resulting capability is switchover between a high-resolution macro mode with a large, preferably central pupil opening, and a perspective mode with a smaller, laterally offset partial pupil. This allows very high light efficiency, which is advantageous in particular with weakly fluorescing objects.

By combining the pupil limitation according to the present invention with the use of synchronized shutters 28a, 28b in the two channels of a stereo tube, it is also possible to simulate a conventional stereomicroscope, the pupils being alternatingly shifted respectively to the left and right and shutters 28a and 28b on the respective eyepiece tube simultaneously being respectively opened and closed. With these electronically controllable components according to the present invention, the detected images can be acquired at more than the flicker frequency, so that a continuous image is visually perceived. The microscope according to the present invention can in particular offer a macroscope mode in which the pupil is set to be central and large and the corresponding image is delivered via the optical channels uniformly to both eyes, i.e. with no stereo impression. This makes the microscope according to the present invention highly versatile, the advantages of a stereomicroscope being combined with the option of a high-resolution macroscope.

Aperture limiter 12 in the form of an LC shutter can control not only an on/off matrix but also transmittance almost continuously, for example from 100% to 50%. This is not possible with the use of the micromirror array. With quasi-continuous control it is possible to create pupil apodization which generates, for example, not a hard pupil edge but instead a smooth transition from light to dark. It is known from diffraction theory that, for example, a sinusoidal pupil transmittance reduces the intensity at the first diffraction maximum to 0. This increases not the resolution but instead the contrast in the resulting image. This capability for pupil apodization makes possible increased image quality as compared with known zoom microscopes.

One example of an application of the microscope according to the present invention is so-called "coded aperture imaging." This application allows elevation to be captured, while simultaneously permitting a large depth of focus and high resolution. Thanks to the great flexibility of the electronically controlled aperture limiter 12, the local coding of the aperture diaphragm can be optimized in controlled fashion for the specific application of the microscope. It is thereby possible in particular to obtain locally resolved image information regarding the object being investigated.

The present invention makes it possible in particular to furnish a zoom microscope having an electronically controllable element for controlling pupil diameter and pupil location.

PARTS LIST

10 Microscope
12 Aperture limiter
14a to 14i Electronically controllable segment
16, 18, 20 Optical channel
22 Beam path
24 Pupil plane
26 Optical axis
28a, 28b Shutter
30 Controller
32 Zoom system
34a to 34e Lens groups of zoom system
36 Objective
38 Object
40 Principal ray of image margin
42, 42a, 42b Image
44a to 44d Marginal rays of axial image point
46 Beam splitter
48 Axis of outcoupled beam path

What is claimed is:

1. A microscope (10), comprising:
a beam path (22) having a pupil plane (24) and an optical axis (26),
an aperture limiter (12), arranged in the pupil plane (24) of the beam path (22), for selectively generating a first optical channel (16) having a first beam path and selectively generating at least one second optical channel (18; 20) having a respective second beam path differing from the first beam path,
the aperture limiter (12) being embodied to set the aperture of the first optical channel (16) and the aperture of the at least one second optical channel (18; 20),
wherein the aperture limiter (12) is embodied such that in a first operating mode the aperture limiter (12) generates the first optical channel (16), and in a second operating mode the aperture limiter (12) generates the at least one second optical channel (18), the first optical channel (16) and the at least one second optical channel (18, 20) being selectively generable,
wherein the aperture limiter (12) is embodied such that in the second operating mode the aperture limiter (12) sequentially generates the at least one second optical channel (18) and a third optical channel (20) having a third beam path differing from the first and second beam paths; and the at least one second optical channel (18) and the third optical channel (20) are each laterally offset relative to the optical axis (26) of the beam path (22) at the pupil plane (24) in which the aperture limiter (12) is arranged, and
a first shutter (28a) and a second shutter (28b), the first shutter (28a), the second shutter (28b), and the aperture limiter (12) being configured such that in the second operating mode the first shutter (28a) is opened and the second shutter (28b) is closed when the at least one second optical channel (18) is generated; and the second shutter (28b) is opened and the first shutter (28a) is closed when the third optical channel (20) is generated.

2. The microscope (10) according to claim 1, wherein the aperture limiter (12) is embodied such that in the first operating mode the first optical channel (16) is centered relative to the optical axis (26) of the beam path (22) at the pupil plane (24) in which the aperture limiter (12) is arranged; and in the second operating mode the at least one second optical channel (18) is laterally offset relative to the optical axis (26) of the beam path (22) at the pupil plane (24) in which the aperture limiter (12) is arranged.

3. A microscope (10), comprising:
a beam path (22) having a pupil plane (24) and an optical axis (26),
an aperture limiter (12), arranged in the pupil plane (24) of the beam path (22), for selectively generating a first optical channel (16) having a first beam path and selectively generating at least one second optical channel (18; 20) having a respective second beam path differing from the first beam path,
the aperture limiter (12) being embodied to set the aperture of the first optical channel (16) and the aperture of the at least one second optical channel (18; 20),
wherein the aperture limiter (12) is embodied such that in a first operating mode the aperture limiter (12) generates the first optical channel (16), and in a second operating mode the aperture limiter (12) generates the at least one second optical channel (18), the first optical channel (16) and the at least one second optical channel (18, 20) being selectively generable,
wherein the aperture limiter (12) is embodied such that in the second operating mode the aperture limiter (12) sequentially generates the at least one second optical channel (18) and a third optical channel (20) having a third beam path differing from the first and second beam paths; and the at least one second optical channel (18) and the third optical channel (20) are each laterally offset relative to the optical axis (26) of the beam path (22) at the pupil plane (24) in which the aperture limiter (12) is arranged, and
wherein the aperture limiter (12) is embodied such that in the second operating mode the at least one second optical channel (18) and the third optical channel (20) are sequentially generated at a frequency that is higher than or equal to the flicker fusion frequency.

4. The microscope (10) according to claim 1, wherein the aperture limiter (12) comprises a plurality of electronically controllable segments (14a to 14i).

5. The microscope (10) according to claim 4, wherein the transmissivity or reflectivity of each segment of the electronically controllable segments (14a to 14i) is individually controllable.

6. The microscope (10) according to claim 1, further comprising a controller (30) for controlling the aperture limiter (12), and further comprising a zoom system (32), the aperture limiter (12) being provided in the zoom system (32), and the controller (30) applying control to the aperture limiter (12) such that the aperture of at least one of the first optical channel (16) and the at least one second optical channel (18) is set as a function of a zoom setting of the zoom system (32).

7. The microscope (10) according to claim 6, wherein the controller (30) applies control to the aperture limiter (12) such that the aperture of at least one of the first optical channel (16) and the at least one second optical channel (18) is set as a function of at least one user preference of a user of the microscope (10).

8. The microscope (10) according to claim 7, wherein the at least one user preference comprises a desired maximum resolution, a desired constant image brightness, or a desired amount of depth of focus and a desired amount of resolution.

9. The microscope (10) according to claim 4, wherein the aperture limiter (12) is embodied such that the aperture of at least one of the first optical channel (16) and the at least one second optical channel (18) is set such that the transmissivity of electrically controllable segments (14*a* to 14*i*) of the aperture limiter (12) is continuously decreased in a lateral direction from the optical axis (26) of the beam path (22).

10. The microscope (10) according to claim 1, wherein the aperture limiter (12) is a liquid crystal matrix having a two-dimensional grid of LCD segments.

\* \* \* \* \*